United States Patent [19]

Maier

[11] 4,313,297
[45] Feb. 2, 1982

[54] BLADE MOUNTING FOR A ROTARY MOWER

[75] Inventor: Martin Maier, Gottmadingen, Fed. Rep. of Germany

[73] Assignee: Klöckner-Humboldt-Deutz AG Zweigniederlassung Fahr, Gottmadingen, Fed. Rep. of Germany

[21] Appl. No.: 150,356

[22] Filed: May 16, 1980

[30] Foreign Application Priority Data

May 18, 1979 [DE] Fed. Rep. of Germany ....... 2920244

[51] Int. Cl.³ .................... A01D 55/18; A01D 55/22
[52] U.S. Cl. .................................................. 56/295
[58] Field of Search ................................ 56/295, 17.5

[56] References Cited

U.S. PATENT DOCUMENTS

| | | | |
|---|---|---|---|
| 3,247,657 | 4/1966 | Scarnato et al. | 56/295 |
| 3,327,460 | 6/1967 | Blackstone | 56/295 |
| 3,418,793 | 12/1968 | Brewer | 56/295 |
| 3,507,104 | 4/1970 | Kline et al. | 56/295 |
| 3,581,482 | 6/1971 | Reber et al. | 56/295 |
| 3,604,189 | 9/1971 | Harer et al. | 56/295 |
| 3,662,529 | 5/1972 | Glunk et al. | 56/295 |

FOREIGN PATENT DOCUMENTS 2612381 10/1977 Fed. Rep. of Germany ........ 56/295

*Primary Examiner*—Paul J. Hirsch
*Attorney, Agent, or Firm*—Karl F. Ross

[57] ABSTRACT

A rotary mower has a cutting plate to which freely pivotal blades are attached by retaining pins. Instead of riveting the pins directly to a leaf spring which holds the pins in place, a keyhole slot is provided in each leaf spring and a narrow waist of the retaining pin fits into rectilinear portion of the keyhole slot and is held in position there by a holding plate riveted to the leaf spring. This allows case hardening of the entire retaining pin and prevents nonuniform stresses in the latter from causing breakage.

4 Claims, 3 Drawing Figures

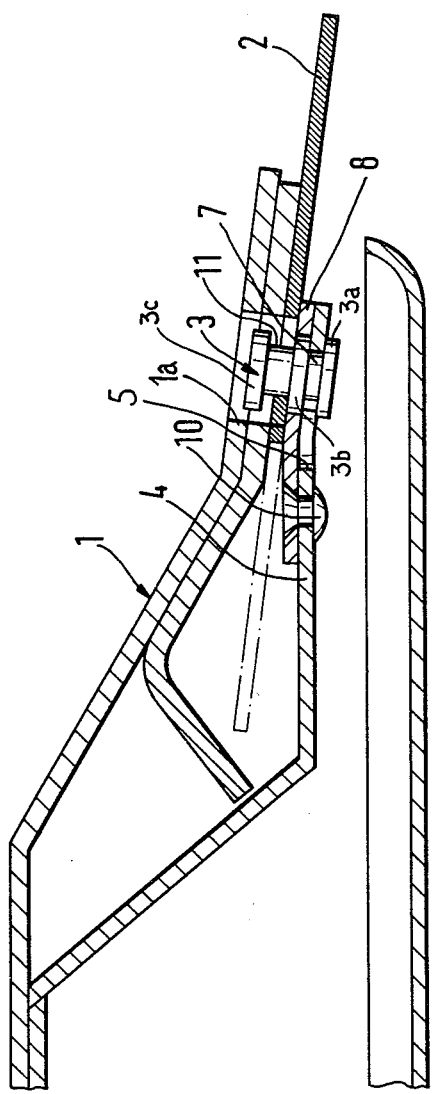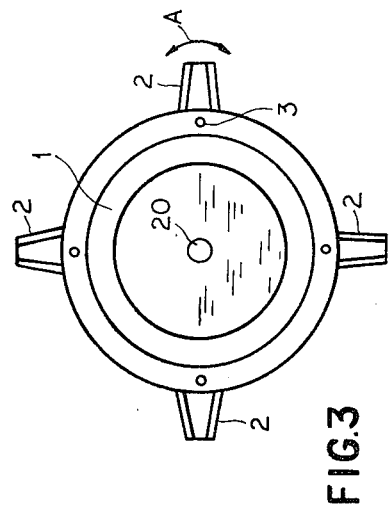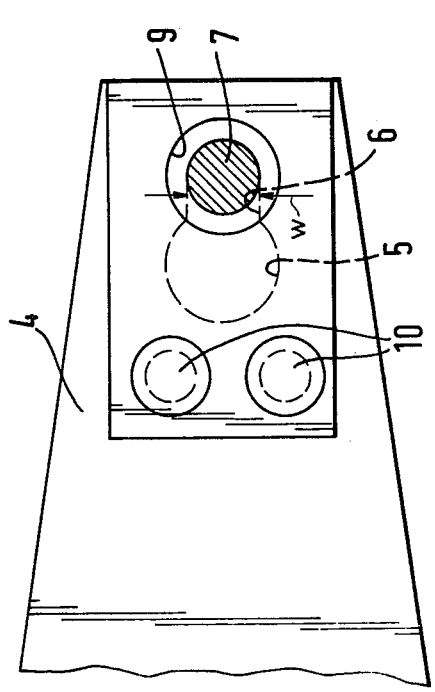

BLADE MOUNTING FOR A ROTARY MOWER

FIELD OF THE INVENTION

My present invention relates to a rotary mower and, more particularly, to a blade-mounting assembly for a rotary mower of the type in which the cutting blades are individually pivotable relative to a cutting plate. The invention especially relates to the blade-mounting assembly in which a leaf spring carries the blade at least in part.

BACKGROUND OF THE INVENTION

In a known rotary mower of this type (German Patent document-Gebrauchsmuster-No. 69 34 709) the retaining pin is secured by a riveted joint directly to the leaf spring.

In order to ensure adequate wear resistance of the retaining pin, it is necessary to harden it by a case-hardening process. However, the rivet head must remain deformable in order to be able to make the riveted joint. For this purpose the part from which the rivet head is subsequently shaped must be masked from the actual hardening process during the case-hardening.

This mode of production of the retaining pin has proved to be highly onerous. Disadvantages have also been experienced because the different hardening zones result in internal stresses particularly in the case of conically shaped retaining pins which are additionally provided with a cylindrical head part.

During the operation of the rotary mower the retaining pin is subject to more or less powerful shock stresses. These frequently cause pieces of material to break away.

More specifically, prior art arrangements in which the retaining pin itself must be deformed by a riveting process have led to difficulties in large measure due to the fact that the deformable head had to be subjected to a different treatment from the body of the retaining pin and this created a threat of danger to the operator, to the machine and to anyone in the vicinity of the mower.

OBJECTS OF THE INVENTION

It is the principal object of the present invention to provide an improved rotary mower whereby the afore-described disadvantages are obviated.

Another object of this invention is to provide an improved blade-mounting assembly for a rotary mower of the type described in which the danger of blade separation and breakage of the retaining or pivot pin for the blade is reduced.

Still another object of this invention is to provide an improved mower assembly which facilitates fabrication of the device and makes the same more reliable.

SUMMARY OF THE INVENTION

These objects and others which will become more readily apparent hereinafter are attained, in accordance with the invention, in a mounting assembly for a free-swinging blade on a cutting plate of a rotary mower in which a leaf spring is mounted on the underside of the cutting plate and receives a pivot or retaining pin upon which the blade is swingably mounted between this spring and the overlying portion of the cutting plate.

According to the invention, the leaf spring is formed with a keyhole-shaped opening having a circular portion of relatively large diameter disposed inwardly (with respect to the axis of rotation of the mower) and an outwardly extending slot whose lateral walls are spaced by a distance less than the diameter of the bore and can receive a narrow waist formed in the retaining pin which thus has larger diameter portions above and below the leaf spring overhanging the lateral walls of the slot.

According to the invention, moreover, a retaining plate having a bore which receives one of these larger-diameter portions flanking the waist is riveted to the leaf spring at a location spaced from the retaining pin and independently thereof.

As a consequence, the retaining pin cannot move radially in the keyhole opening and can serve as the blade pivot without having to be deformed by riveting or otherwise.

The rotary mower according to the invention, therefore, uses a retaining pin which has a waist which corresponds to the spacing of the opposite walls of a lateral slot extending from a leaf spring bore, the dimensions of which correspond to those of the retaining pin.

To secure the retaining pin in its position there is provided in the region of the slot a plate which can be placed over the retaining pin by a bore corresponding to the external dimensions of the pin, and after the retaining pin is transferred with its waist into the region of the slot, can be fixed to the leaf spring by a riveted joint.

With this construction according to the invention the retaining pin can be totally hardened without problems, without requiring masking in a specific region of the pin. Differential structural stresses are largely avoided. It can easily be introduced into the bore of the keyhole-shaped recess of the leaf spring, and after sliding radially outwardly can be fixed in this position with reference to the leaf spring by the plate, by riveting the latter to the leaf spring.

It has particularly been found highly advantageous from the technical production standpoint if the retaining pin is formed as a cylindrical pin which has a groove machined therein by turning and constituting the waist.

In a highly advantageous manner the plate is placed over the retaining pin on the top side of the leaf spring confronting the cutter and riveted to the leaf spring.

BRIEF DESCRIPTION OF THE DRAWING

The above and other objects, features and advantages of the present invention will become more readily apparent from the following description, reference being made to the accompanying drawing in which:

FIG. 1 is an axial cross-sectional view through a cutting unit of a mower in the region of the blade-mounting assembly;

FIG. 2 is an elevational view of the outer end of a leaf spring showing its relationship to the retaining pin of this assembly, the retaining pin being seen in section; and FIG. 3 is a plan view of the cutter unit of the mower.

SPECIFIC DESCRIPTION

Referring first to FIG. 3, it can be seen that a rotary mower can comprise a cutter unit whose cutting plate 1 is mounted on a shaft 20 which can be one of several provided on a housing extending across a field to be mowed, the shafts being driven by bevel gearing, chain transmissions or the like from the power takeoff of a tractor which can tow the implement across the field. It also may be mounted below, or as, an outrigger on, a tractor, all in accordance with conventional principles.

The basic concept is discussed in the aforementioned German patent document. In the embodiment shown the cutter plate 1 carries four blades 2 in angularly equispaced relationship, each blade being freely swingable about its retaining pin 3 as represented by the double-headed arrow A.

The retaining pin 3, whose function will be described in greater detail below, is a case-hardened member free from stresses resulting from nonuniform hardening and has a cylindrical head 3a underlying the leaf spring 4 and of a large diameter compared to a waist 7 machined by turning therein. The pin also has a large-diameter cylindrical portion 3b of the same diameter as head 3a, the axial spacing of portions 3a and 3b being substantially equal to the thickness of the leaf spring 4. The diameters of portions 3a and 3b are slightly less than the diameter of the circular bore 5 of the keyhole slot 5, 6 whose rectilinear portion has a spacing w which is less than the diameter of portions 3a and 3b so that the latter overhang the slot laterally. The waist 7 has a diameter substantially equal to w.

The pin 3 has another groove 11 machined therein by turning which can be received in a keyhole slot of the blade 2 which can have its rectilinear portion lying radially inwardly. The pin 3 finally terminates in another large-diameter portion 3c whose diameter is the same as that of portions 3a and 3b. The large diameter portion 3c can be received in a hole 1a in the cutting plate 1.

Thus as may be seen from the drawing, the cutting unit illustrated comprises the cutting plate 1, on the underside of which cutters 2 are mounted freely swinging, each about a vertical retaining pin 3.

For this purpose the retaining pin 3 is anchored to the leaf spring 4. The leaf spring 4 exhibits a keyhole-shaped recess which is constituted by a bore 5 with a lateral slot 6. The retaining pin 3 is formed as a cylindrical body and has a waist 7 formed by a groove machined in the pin by turning, the external diameter of which corresponds to the interval of the opposite walls of the slot 6.

The external diameter of the cylindrical body is somewhat smaller than the diameter of the bore 5 of the leaf spring 4. The retaining pin 3 can therefore be slid into the bore 5 of the leaf spring and then displaced radially outwards, while its waist 7, and groove constituted by the groove comes to lie between the walls of the slot 6 of the bore 5 of the leaf spring 4.

In this way the retaining pin 3 is secured with reference to the leaf spring transversely to the plane of the latter.

In order to prevent displacement of the retaining pin 3 into the region of the bore 5 and therefore detachment from the retaining spring 4, there is associated with the latter a plate 8 which can be placed over the retaining pin by a bore 9 corresponding to the external dimensions of the retaining pin 3, and after the retaining pin has been transferred with its waist 7 into the region of the slot annex 6, can be fixed to the leaf spring 4 by a riveted joint 10.

In the embodiment shown the riveted joint 10 is constituted by two rivets, by means of which the plate 8 is anchored to the leaf spring 4. The plate 8 is placed over the retaining pin 3 on the top side of the leaf spring 4 confronting the cutter 2 and is riveted to the leaf spring 4. The retaining pin 3 has in this region a further groove 11 machined therein by turning, with which the bore wall of the cutter 2 comes into abutment.

I claim:

1. A blade-mounting assembly for a rotary mower comprising:
   a cutting plate rotatable about a substantially vertical rotary axis;
   at least one blade disposed along the underside of said cutting plate;
   a leaf spring extending radially outwardly and underlying said blade, said leaf spring being formed with a keyhole-shaped opening having a large-diameter circular portion and a rectilinear portion extending from said circular portion of a width less than the diameter of said circular portion;
   a retaining pin having a narrow waist of a diameter less than the external diameter of said pin on opposite sides of said waist and receivable in said rectilinear portion for pivotally mounting said blade on said cutting plate; and
   a retaining plate having a bore of a diameter corresponding to said external diameter and engaging said pin while being riveted to said leaf spring to prevent movement of said pin along the rectilinear portion of said keyhole-shaped opening.

2. The assembly defined in claim 1 wherein said pin is formed with an annular groove constituting said waist.

3. The assembly defined in claim 1 or claim 2 wherein said retaining plate is disposed between an upper side of said leaf spring and the underside of said blade.

4. The assembly defined in claim 3, further comprising two rivets spaced from said pin securing said retaining plate to said leaf spring.

* * * * *